Oct. 7, 1941.   W. E. SYKES   2,257,989
GEAR LAPPING MACHINE
Filed Feb. 7, 1939   7 Sheets-Sheet 5

Fig. 5

INVENTOR
William E. Sykes
BY Albert R. Henry
ATTORNEY

Patented Oct. 7, 1941

2,257,989

UNITED STATES PATENT OFFICE 2,257,989

GEAR LAPPING MACHINE

William Edwin Sykes, Manor Works, Staines, England

Application February 7, 1939, Serial No. 255,108

3 Claims. (Cl. 51—26)

This invention relates to a lapping machine which may be used for lapping gears of various types.

The invention is more particularly directed to the lapping of helical gears of the herringbone type. These gears are cut with great accuracy on the known type of gear generators, and it necessarily follows that the succeeding lapping operation must be performed with great precision, else the inherent virtue of this type of gearing may be lost. Prior to this invention, the accurate lapping of herringbone gears was accompanied by laborious checking and measuring operations which added considerably to the expense of producing such gears, and which encouraged the inclusion of small errors in the process.

In the present machine these difficulties are overcome by providing bearings which support the gears on axes which may be rendered truly parallel without recourse to numerous adjustments. This effect is facilitated by the provision of several registering micromatic gauges which are organized with the bearing structures which support the gears. These gauges indicate the slightest fluctuation in eccentricity and end thrust of the lapping gears, and therefore reflect errors in the initial cutting of the gears. Minor errors may, of course, be corrected by lapping under control of the adjustable elements of the machine.

The invention includes various other adjustable instrumentalities and driving connections which aid the operator in setting up the machine for gears or various sizes. The more specific features of the invention are set forth in greater detail in the accompanying specification and drawings, wherein:

Figure 1:
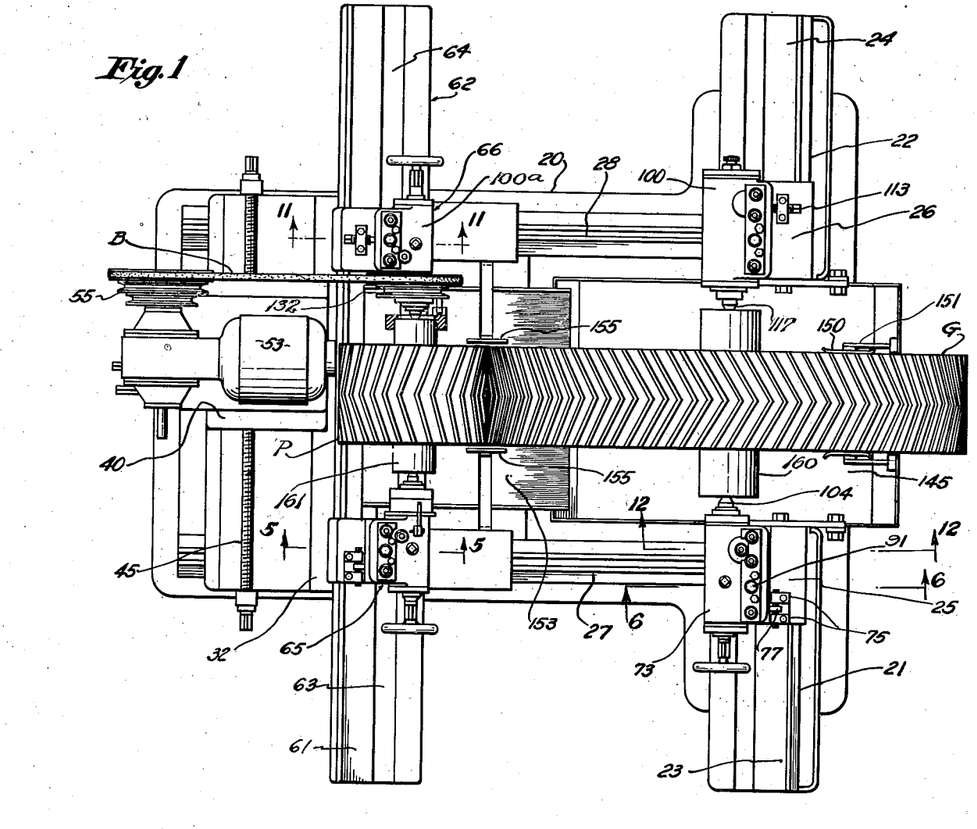
Fig. 1 is a plan of the machine wherein two herringbone gears are positioned for lapping.
Figure 3:
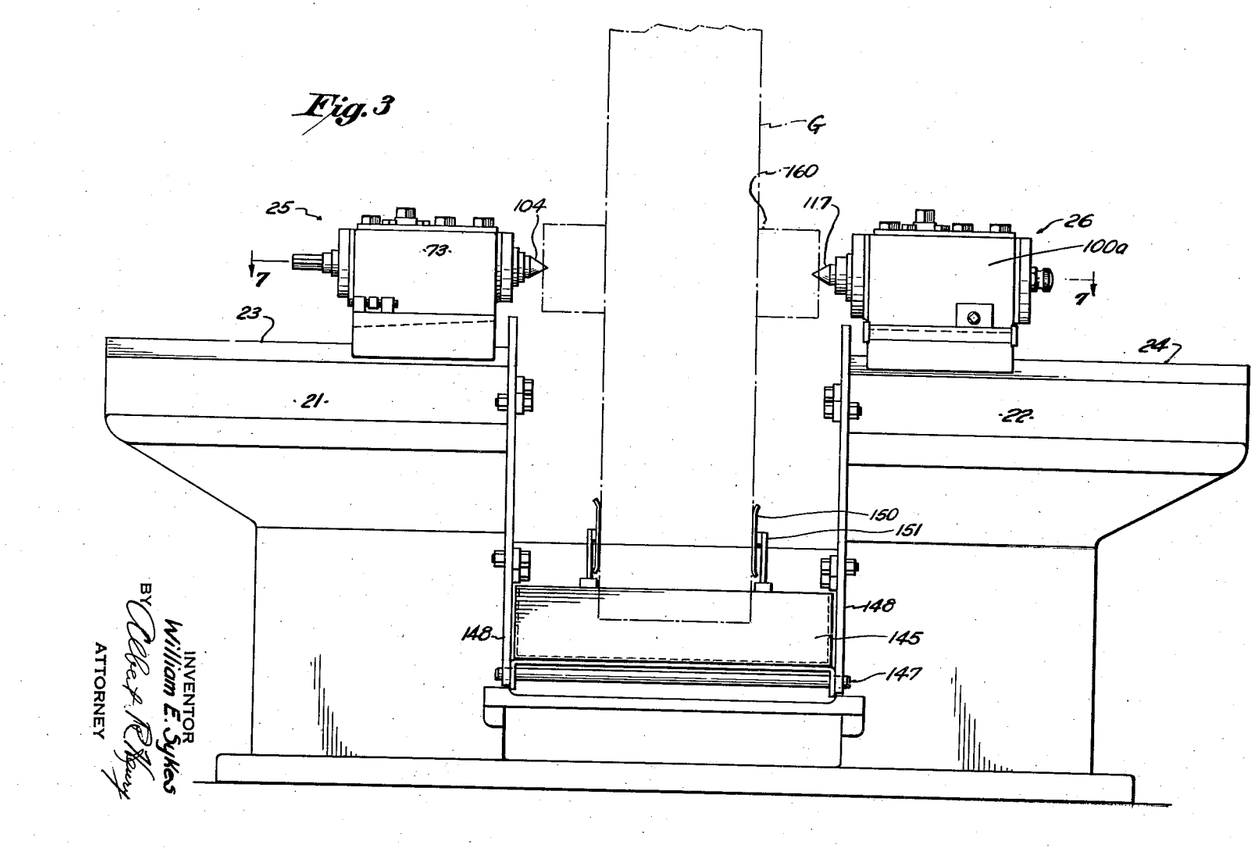
Fig. 3 is an end view of the right hand end of the machine as viewed in Fig. 2.

The machine consists of a base 20 (Figs. 1 and 3) having at one end thereof a pair of spaced pedestals 21 and 22 formed with transverse angular ways 23 and 24 providing supports for bearing units 25 and 26. The bearing units support for rotation the larger of a pair of meshing gears G. The base is also formed with spaced longitudinally extending ways 27 and 28, provided with T-slots 29 and 31 (Fig. 4), which serve to support a longitudinally adjustable carriage 32. The carriage 32 carries the smaller of the meshing gears P, as will be hereinafter described, and the carriage may be locked in any desired position by means of T-bolts 33 carried in the slots 29 and 31, and extending through suitable holes in the gib portions 30 of the carriage.

Figure 5:
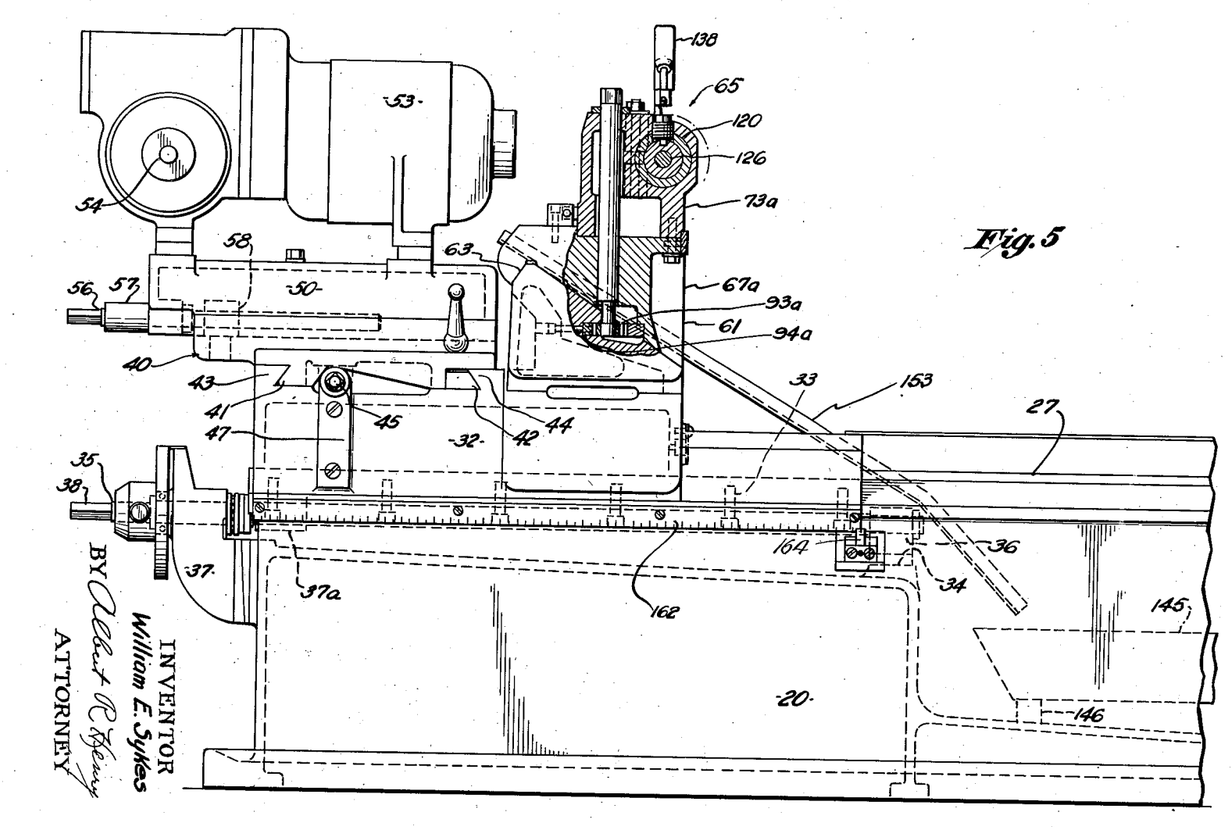
Fig. 5 is a side view of the machine with the bearing structure shown in section, said section being taken on the line 5—5 of Fig. 1.

Longitudinal adjustment of the carriage is facilitated by a screw 35, one end of which is carried in a bearing 36 which is secured in a boss 34 located at the right hand extremity of the base 20 (Fig. 5). The other end of the screw projects successively through a pedestal 37 secured to the base 20, and a nut 37a which is secured to the carriage 32. The extremity 38 of the screw is formed with a squared portion to facilitate operation by a suitable crank.

The carriage 32 supports bearing units 65, 66 which carry the pinion P (or the smaller of the meshing gears), and it also carries a supporting structure for adjustably positioning a motor drive unit for driving the pinion P. The drive unit consists of a motor carriage 40 formed with gib portions 41 and 42 (Figs. 3 and 4), which are received in transverse ways 43 and 44 on the carriage 32. The motor carriage is moved by a transverse screw 45, which projects through a nut portion 46 formed thereon. The ends of the screw are mounted in bearing members 47 carried by the main carriage 32 and disposed on opposite extremities of the motor carriage.

The motor carriage 40 is formed with longitudinally extending ways 51, which receive the gib portions 52 of a motor supporting saddle 50. An electric motor 53, of the geared head type, is secured to the saddle 50, with its final shaft 54 disposed transversely and carrying a multiple pulley 55. The saddle 50 and accompanying motor are adjustably movable in the ways 51 through the aid of an adjusting screw 56 which is supported in a bearing 57 forming part of the saddle 50 and which engages a nut portion 58 on the carriage 40.

The carriage 32 is formed with spaced pedestals 61 and 62, which resemble the pedestals 21 and 22 of the base 20. The upper extremity of these pedestals are formed with angular ways 63 and 64 which slidably support bearing units 65 and 66.

The four bearing units 25, 26 and 65, 66 which are mounted respectively on the fixed pedestals 21, 22 of the base and the pedestals 61, 62 of the main carriage 32, are individually adjustable to bring the gear and pinion into whatever degree of engagement is dictated by the lapping process. The units 25, 65 on the front of the machine may be raised or lowered a slight distance for this purpose without any longitudinal movement being permitted. The rear bearings 26, 66 are adjustable only in a longitudinal direction, and thus it will be apparent that the axes of the gear and pinion shafts may be brought into true parallelism or may be deliberately misaligned, if desired.

It is preferred that one of the gear shafts be additionally permitted free axial movement during the lapping operation, and in the present construction the carriage bearing units 65, 66 are adapted for this feature. Otherwise, the opposed units will be found generally similar in structure and function, and accordingly in several instances similar numerals are utilized to indicate comparative parts.

The bearing unit 25 (Figs. 6, 7, 8, 12) comprises a fabricated structure including a saddle 67 having a slide portion 68 which rides on the way 23 of the fixed pedestal 21. The upper extremity of the saddle 67 is formed with a surface 69 which is inclined transversely with respect to the bed 20. The surface 69 is bordered by a shoulder 71 and a guide strip 72 (Fig. 6) to provide a transverse track for receiving a bearing block 73 which is formed with a complementary angular surface 74. The saddle 67 is formed with a pair of spaced nut portions 75 for receiving screws 76, while the bearing block 73 carries a dowel 77 which is disposed between the ends of the screws to provide a lateral adjustment for the bearing block 73.

Figures 6, 11, 12:
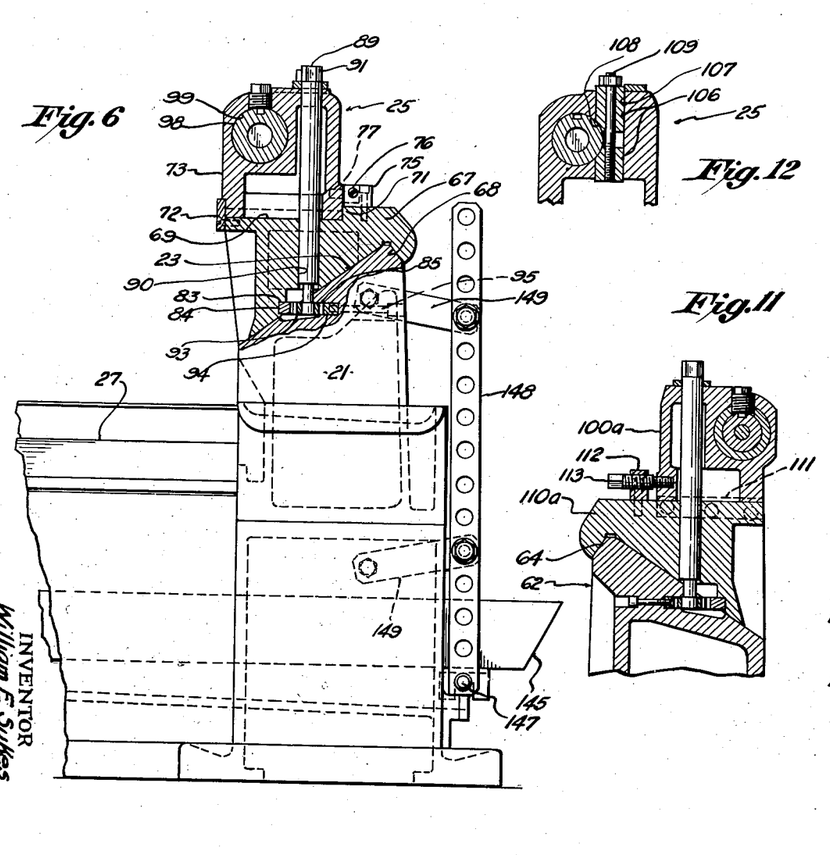
Fig. 6 is a similar section taken on the line 6—6 of Fig. 1.
Fig. 11 is a section on the line 11—11 of Fig. 1.
Fig. 12 is a section on the line 12—12 of Fig. 1.
Figure 8:
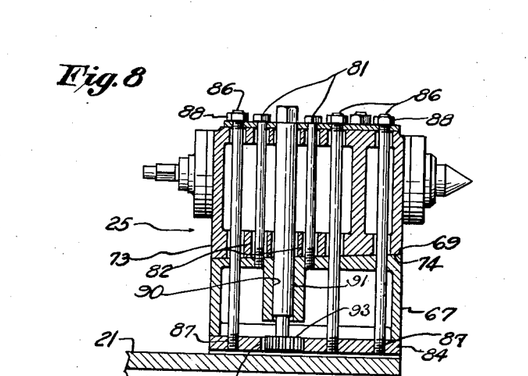
Figs. 8 and 9 are sections on the lines 8—8 and 9—9 respectively of Fig. 7.

The bearing block 73 is clamped to the saddle 67 by screws 81 which extend through clearance holes 82 in the block 73 and enter suitable tapped holes in the saddle 67 (Figs. 6 and 8). The lower extremity of the saddle 67 is shouldered as indicated by the numeral 83 to receive a clamping plate 84, the right hand edge of which plate is slidably received in a groove 85 formed in the pedestal 21. Three clamping screws 86 extend through the block and saddle and are provided with threaded extremities 87 which are received in tapped holes in the clamping plates 84. When nuts 88, on the upper extremity of the screws 86, are pulled up, the block 73 and saddle 67 are more firmly secured together, and in addition the clamping plate 84 is brought into clamping engagement with the upper wall of the groove 85 to prevent movement of the unit 25 on its way 23.

The saddle 67 is formed with a vertical bearing 90 (Fig. 6) for receiving a shaft 91 which projects through clearance holes in the overlying block 73 and terminates in a squared portion 89. A pinion 93 is secured to the lower end of the shaft 91, and it meshes with a rack 94 which is secured within the groove 85 of the pedestal 21 by screws 95. When the clamping screws 86 are loosened, the assembled block 73 and saddle 67 may be moved along the ways 23 to any desired lateral position by turning the shaft 91. It will be observed in Figs. 6 and 8 that the previously described clamping plate 84 is provided with a clearance notch 96 for the pinion 93.

Figure 7:
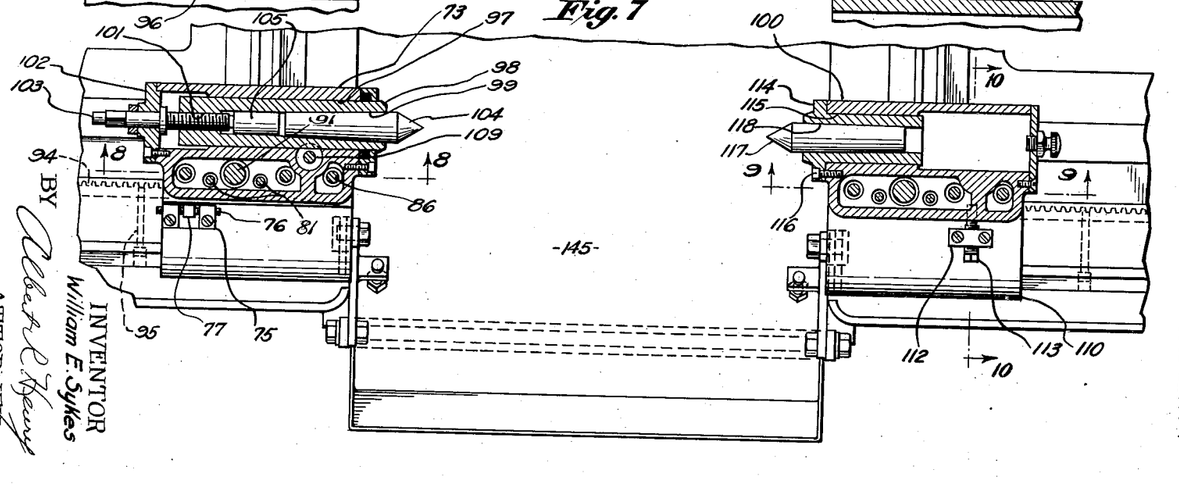
Fig. 7 is an enlarged section on the line 7—7 of Fig. 3.

The block 73 is provided with a horizontal bore 97 for receiving an adapter 98 which contains a tapered hole 99 and a tapped hole 101 (Fig. 7). A flanged head 102 is secured to the block 73 to cover the bore 97, and it rotatably receives an adjusting screw 103 which enters the tapped hole 101. A tapered center pin 104 is firmly positioned in the tapered hole 99. Operation of the screw 103 permits longitudinal adjustment of the adapter 98 and accompanying center pin 104 for a slight distance. However, excessive manipulation of the screw 103 will bring it into contact with a plug 105 which engages and ejects the center pin 104 from its bore 99. The adapter is secured after adjustment by a clamp (Fig. 12) consisting of a pair of cylindrical members 106 disposed in a vertical drilled hole 107 of the block adjacent the bore 97. The members are formed with curved surfaces, as indicated by the numeral 108, which engage the adapter when they are moved into clamping position by means of a screw 109.

As will be observed in Fig. 5, the front bearing unit 65 of the carriage is constructed in a manner similar to the bearing unit 25, to provide for vertical adjustment of its bearing block 73a on its saddle 67a. The clamping of the block to the saddle is obtained by screws 86a, and the lateral movement of the unit is controlled by a rack and pinion connection 93a, 94a, of similar construction to that of the described unit 25.

Figure 4:
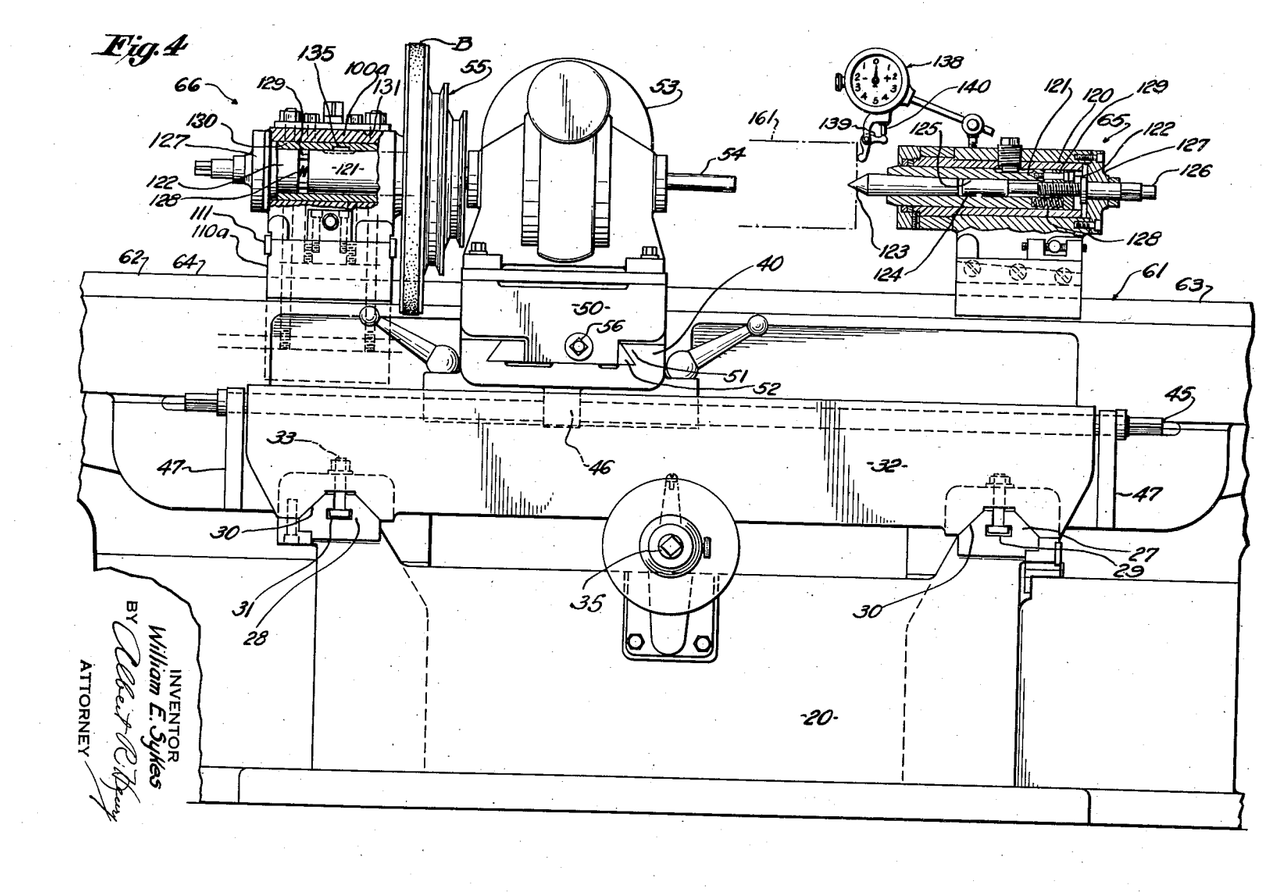
Fig. 4 is an enlarged fragmentary view of the opposite or driving end of the machine with the bearing structures shown in vertical section.
Figure 9:
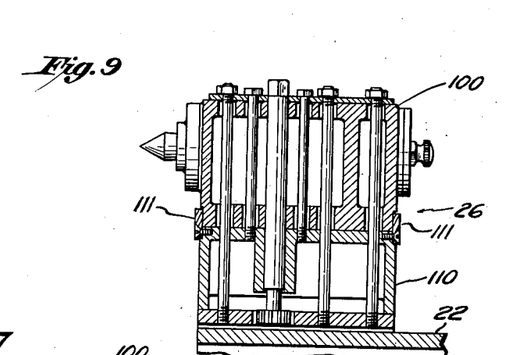
Figure 10:
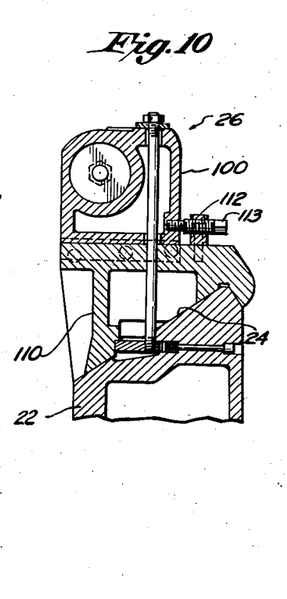
Fig. 10 is a section on the line 10—10 of Fig. 7.

Referring now to the rear bearing units 26, 66, it will be observed that they are provided with similar clamping and adjusting structures, as will be apparent by reference to Figs. 4, 7 and 9. In these units, however, the bearing blocks 100, 100a thereof are mounted on their saddles 110, 110a for longitudinal adjustment by means of strips 111 which are secured to the ends of each saddle to provide a track for each block (Fig. 9) wherein movement only in a longitudinal direction is possible.

Each of these saddles carries an attached nut 112 for receiving a screw 113 which is movable into contact with the block for obtaining the described adjustable movement. Clamping of the block after the adjusting operation is obtained in a manner similar to that in described unit 25. A flanged adapter 114 is mounted within the horizontal bore 115 of the block 100 and it is rigidly secured by screws 116 (Fig. 7). A center pin 117 is positioned within the tapered hole 118 of the adapter 114.

As previously mentioned, the units 65, 66 are devised to provide a floating support for the pinion shaft, thus differing from the units 25, 26 which support the gear shaft against axial movement (Fig. 4). The unit block 73a of the unit 65 carries a bushing 120, within which an adapter 121 and a nut 122 are slidably received. The adapter receives a center 123 and an ejector plug 124 within its bore 125. The nut 122 is tapped to receive an adjusting screw 126 which is rotatably carried in a head 127, which in turn is secured to the block 73a.

Compression springs 128 are interposed between the adapter 121 and nut 122, and the spacing between the adapter 121 and nut 122 is limited by studs 129 which are carried by the adapter 121 and which engage through suitable holes in the nut 122.

In the unit 66, a hollow shaft 130 is rotatably carried in a bearing 131 in the block 100a, and a pulley 132 is secured to the shaft 130. The pulley 132 is connected to the pulley 55 of the motor 53 by a belt B. An adapter mechanism is carried within the hollow shaft 130 with the adapter 121 thereof secured against rotary movement by a key 135. The head 127 of this unit is secured to the hollow shaft 130 while the nut 122 is carried within the bore of the shaft 130. It will thus be seen that as the shaft 130 is rotated, the entire adapter mechanism therein is also rotated because of the key connection 135 between the adapter 121 and the shaft 130. The adapter 121, although thus connected for rotation with the shaft 130, may nevertheless slide longitudinally on its key connection 135 to provide a floating support, as in the unit 65.

The block 73a of the unit 65 serves as a support for a registering dial gauge 138, which may be of the type having a bell crank connection 130 to its spindle 140.

Figure 2:
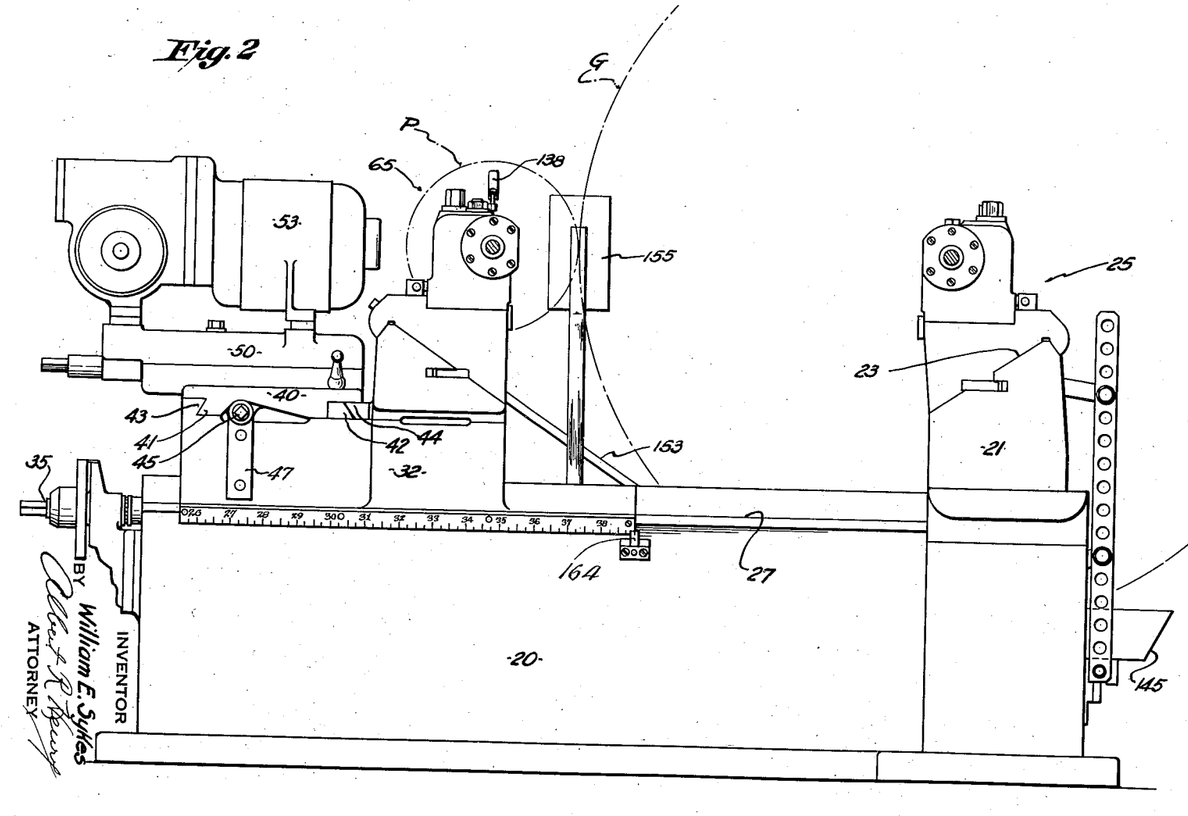
Fig. 2 is a side elevation of the machine.

The large gear G, which is mounted between the bearing units 25, 26, has its lower portion received in a tank 145 containing liquid lapping compound. The tank is supported at its left hand end on straps 146, and at its opposite end it rests on a bar 147 which is mounted in the holes of a vertically disposed pair of straps 148. The straps are carried by strut members 149 which are secured to the pedestals 21, 22. Doctors 150, attached to brackets 151 mounted in the tank 145, are positioned on opposite faces of the gear to wipe excess compound off the gear. A trough 153 is secured to the carriage 32 directly under the pinion P and it extends angularly downward for drainage into the tank 145. Shields 155 are disposed on opposite sides of the mating gear and pinion, as shown in Fig. 2, to protect the machine from the ejection of liquid.

In operation, the gear G and pinion P are secured to shafts 160, 161 respectively, which are centered to receive the pointed ends of the center pins 104, 117 carried by the bearing units 25, 26, 65, 66. The gear G and pinion P are brought into precise center spacing by moving the main carriage 32 to bring the gears in mesh. To eliminate the necessity of measuring the center distance, the carriage 32 carries a longitudinally disposed scale 162 which is suitably graduated and calibrated to register with an indicator pointer 164 which is secured to the machine bed (Figs. 2 and 5). This insures accurate spacing of the gear shaft 160 with respect to the front bearing units 25, 65. When the gears being lapped are of the double helical type, as shown, the shafts 160 and 161 are usually disposed in true parallelism, and therefore the rear bearing units 26, 66 are accurately aligned with their companion units 25 and 65 before mounting the gears. The shafts 160 and 161 may be adjusted for horizontal parallelism by moving the blocks 73, 73a of the units 25, 65 either in or out for vertical adjustment. This, of course, does not disturb the previous adjustment for obtaining the correct center spacing.

Inasmuch as the bearing units 25, 26, 65 and 66 are individually adjustable transversely of the machine, the apices of the teeth of the pinion P and gear G may likewise be brought into accurate registry by simply utilizing the pinion and rack adjustment of each unit. Finer degrees of lateral adjustment may be obtained through the adapter adjusting screws.

The motor drive unit, being disposed for transverse and longitudinal adjustment, is easily positioned to bring the rear pulley 55 into alignment with the pulley 132 of the adapter of the unit 66. The longitudinal adjustment of the motor saddle 50, in addition, permits proper tightening of the drive belt B. As in other types of lapping machines, the meshing gears are slowly rotated for a considerable period of time to polish the teeth and to correct slight discrepancies in profile which may be caused by errors in the preceding generating operation.

In the lapping of double helical gears the machine also becomes a device for testing the accuracy of the gear teeth, especially with regard to the alignment and concentricity of the gear shaft and the pitch line of the teeth. This type of gearing is unique in that any variation in this respect will make itself apparent by slight axial movement of the gears, which, in the present machine, is permitted by the floating mounting of the bearing units 65, 66. These movements may be accurately measured by the gauge 138, which may indicate that the gear set-up should be modified, that the gear bearings are not true, or that the teeth of the mating gears are not perfectly matched. When this error is indicated as being quite small, it may be lapped out during the lapping process, and, inasmuch as the gauge continuously indicates inequalities, the operator may be continuously apprised of the success of the operation.

It is not intended that the machine be limited in use to the lapping of double helical gears, as it will be apparent to those skilled in the art that it may be used on straight or single helical teeth with equal effectiveness. The invention is set forth in the following claims.

I claim:

1. A gear lapping machine comprising a machine bed having longitudinally extending slides, a carriage carried by the slides, means for adjustably moving the carriage on the slides, transversely aligned slides formed on the carriage, a pair of bearing units mounted on the carriage slides and each having a bearing block, a center pin affixed to each bearing block, said pins being utilized to mount a gear carrying shaft for rotation therebetween, fixed pedestals on the bed located adjacent one end of the bed slides and having transversely aligned slides, a pair of bearing units on the pedestal slides, each having a bearing block, a center pin affixed to each block for rotatably receiving the shaft of the remaining lapping gear, one of each pair of said blocks being mounted for longitudinal adjustment relative to said bed and the remaining two blocks being mounted for vertical adjustment, means for moving said bearing units on their respective slides, means for locking the units against movement, and drive means on the carriage having a driving connection with the gear shaft on said carriage.

2. A gear lapping machine comprising a machine bed having longitudinally extending slides, a carriage carried by the slides, means for adjustably moving the carriage on the slides, a pair of transversely aligned slides formed on the carriage, fixed pedestals on the bed located adjacent one end of the bed slides and having transversely aligned slides, a saddle carried on each transverse slide, a bearing block on each saddle, one of each pair of saddles having adjustable means for raising or lowering their respective blocks and the remaining two saddles having longitudinally extending ways for carrying their respective blocks for longitudinal adjustment, each pair of blocks having opposed means for rotatably supporting a gear carrying shaft, manually operable drive means on each saddle having a connection with the associated slide whereby each saddle is adjustably movable on its slide, clamping means for locking the saddles and accompanying blocks against adjustable movement on their slides, and drive means on the carriages having a driving connection with the gear carrying shaft on said carriage.

3. A lapping machine for helical gears comprising a machine bed, a pair of spaced aligned bearing units carried by the bed, each unit having an axially slidable bushing therein, an adapter carried by each bushing and supplied with shaft supporting means, a gear carrying shaft disposed between the units and supported at each end by said supporting means, a second pair of bearing units mounted on the bed in spaced relation to said first pair, each unit of said second pair having axially fixed shaft supporting means, a second gear carrying shaft carried between the supporting means of said last named bearing units, drive means for one of said shafts, and a gauge organized with said first named shaft and adapted to register axial movement of its shaft, as occasioned by slight cutting errors in the helical gears being lapped.

WILLIAM EDWIN SYKES.